(12) United States Patent
Robinson et al.

(10) Patent No.: US 8,328,092 B1
(45) Date of Patent: Dec. 11, 2012

(54) ELECTRONIC MEMORY KEY

(75) Inventors: Douglas Paul Robinson, Tampa, FL (US); Robert James McCanney, Clearwater, FL (US); Michael Edward Krawczyk, Tampa, FL (US)

(73) Assignee: Sypris Electronics, LLC, Tampa, FL (US)

( * ) Notice: Subject to any disclaimer, the term of this patent is extended or adjusted under 35 U.S.C. 154(b) by 1145 days.

(21) Appl. No.: 12/125,597

(22) Filed: May 22, 2008

(51) Int. Cl.
*G06K 5/00* (2006.01)

(52) U.S. Cl. .......................................... 235/382; 439/75
(58) Field of Classification Search .................. 235/382; 439/75
See application file for complete search history.

(56) References Cited

U.S. PATENT DOCUMENTS

| | | | |
|---|---|---|---|
| D186,856 S | 12/1959 | Sedley | |
| 3,812,403 A | 5/1974 | Gartner | |
| 4,872,329 A | 10/1989 | Byrne | |
| 5,227,614 A | 7/1993 | Danielson et al. | |
| 5,437,174 A | 8/1995 | Aydin | |
| 5,537,103 A | 7/1996 | Lavelle et al. | |
| 5,587,955 A | 12/1996 | Lee et al. | |
| D377,647 S | 1/1997 | Fekete et al. | |
| D378,580 S | 3/1997 | Fekete et al. | |
| 5,749,253 A | 5/1998 | Glick et al. | |
| 5,831,827 A | 11/1998 | Fekete et al. | |
| 5,848,541 A | 12/1998 | Glick et al. | |
| 5,862,354 A | 1/1999 | Curiger et al. | |
| 5,904,590 A | 5/1999 | Fekete | |
| 5,961,356 A | 10/1999 | Fekete | |
| 6,020,826 A | 2/2000 | Rein | |
| 6,064,316 A | 5/2000 | Glick et al. | |
| 6,330,977 B1 | 12/2001 | Hass et al. | |
| D457,051 S | 5/2002 | Davis | |
| 6,750,755 B2 | 6/2004 | Litwiller et al. | |
| 6,885,284 B2 | 4/2005 | Litwiller et al. | |
| 7,069,755 B2 | 7/2006 | Lies et al. | |
| D535,952 S | 1/2007 | Fekete et al. | |
| 7,395,166 B2 * | 7/2008 | Plishner | 702/108 |
| 7,462,035 B2 * | 12/2008 | Lee et al. | 439/37 |
| 2002/0097142 A1 | 7/2002 | Janiak et al. | |
| 2009/0246985 A1 * | 10/2009 | Mackey et al. | 439/75 |

\* cited by examiner

*Primary Examiner* — Daniel Hess
(74) *Attorney, Agent, or Firm* — Middleton Reutlinger; James E. Cole

(57) ABSTRACT

An electronic memory key is described. The key includes internal memory and contact points on an exemplary flat and annular surface with a mechanical fastening mechanism to securely affix the key to a device interface. Corresponding contacts are provided on the device to electronically communicate the key to device.

32 Claims, 7 Drawing Sheets

ELECTRONIC MEMORY KEY

FIELD OF THE INVENTION

The present invention relates generally to electronic memory key designs and more particularly the present invention relates to electronic key systems utilizing contact surfaces for removable engagement to a dedicated secure device for decoding, encryption and the like.

DETAILED DESCRIPTION OF THE INVENTION

Figure 1:
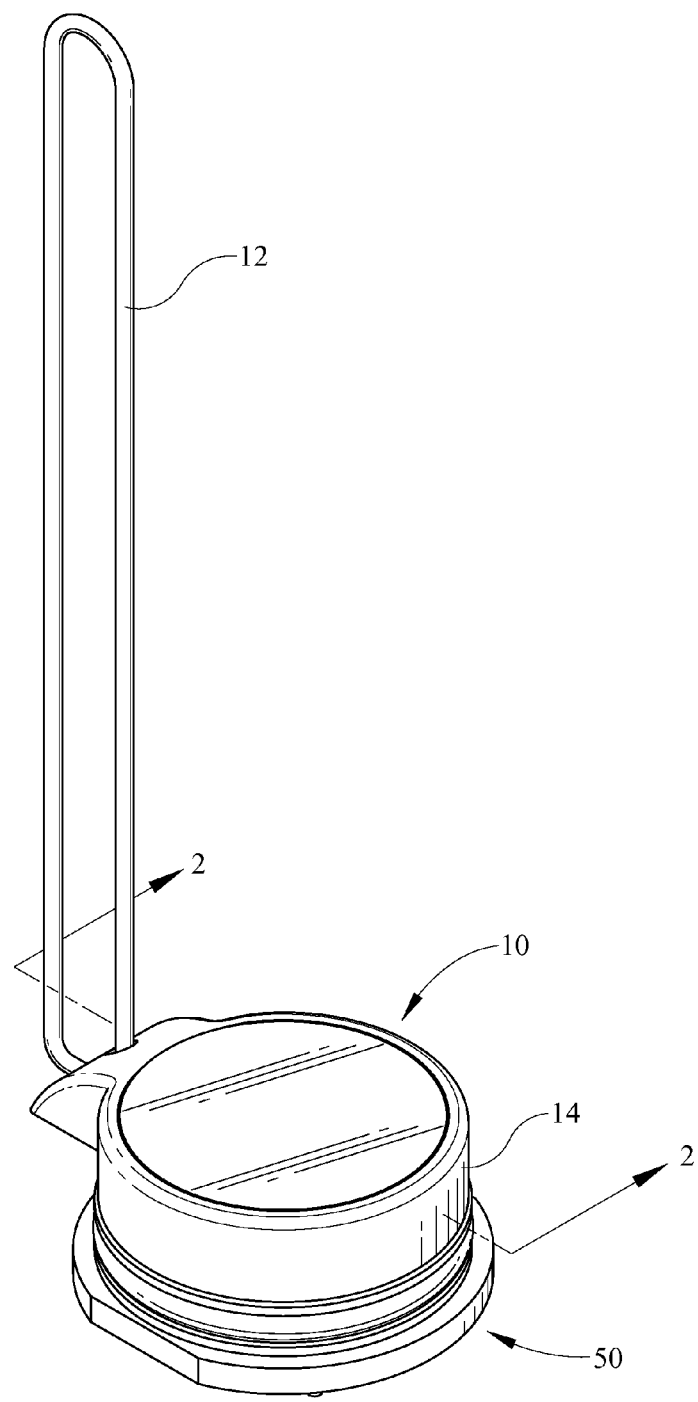
FIG. 1 is a perspective view of the electronic memory key interfaced with a portion of an electronic device receptacle.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

The electronic memory key 10 of the present invention is directed towards utilization of an electronic memory key in combination with a portable electronic system or other similar device which requires interfacing contact to an electronic memory key in order to be operable. Electronic key memory devices have been proposed and utilized in many different scenarios and implementations such as crypto ignition keys, data logging applications, portable electronic interfacing and encryption, data transport to and from remote and localized stations, and other types of implementation and functionality specifically concerned with utilizing a receptacle for receiving a data encryption electronic memory key for activation of a computer system, electronic device or similar system by insertion of the electronic memory key into the device.

In exemplary use, the electronic memory key may be similar to a crypto ignition key (CIK) which is a security developed EEPROM package having varying storage capacity depending upon the design but typically enough to store multiple encryption keys. These types of electronic memory keys may be utilized in key splitting applications wherein either a portable electronic device or the electronic memory key utilized alone does not provide functionality but when combined they may be utilized to provide an encrypted connection or electronic functionality. For example, a secure telephone unit such as an STU-III is used in combination with a KSD-64 crypto ignition key. As is known, the crypto ignition key may activate the electronic device into a secure mode through various encryption technologies through the use of an encoded cryptographic software key stored in an EEPROM on the electronic memory key. Various methodologies for encryption of such communication and for utilization of such devices are known such as is described in U.S. Pat. No. 5,887,064 hereby incorporated by reference. Similar longitudinally extending crypto ignition keys and corresponding keyways are known for implementation of various circuit elements with a memory key as is set forth in U.S. Pat. No. 4,659,915 and U.S. Publication No. US2007/0188302 both contents of which are incorporated herein by reference.

As is shown in FIG. 1, a similar electronic memory key 10 is disclosed wherein the electronic memory key 10 may be affixed to a lanyard or other device 12 for supporting around a users neck or similar use. In general, the electronic memory key 10 may be utilized to contain a data encryption set in order to provide access and control to portable electronic systems by insertion of the electronic memory key 10 into an appropriate mating receptacle 50. Generally, the electronic memory key 10 has internally thereof a memory device 28 electronically connected to a circuit board 20 with plated contact surfaces 20a which is molded within an annular plastic housing 14. In addition, the design of the electronic memory key 10 of the present invention incorporates the utilization of a mechanical snap feature 25, 27, 29 which allows for mechanical attachment or contacting structure between the electronic memory key 10 and the electronic device. The plated contact surfaces 20a are in electrical contact with a circuit and/or memory storage component 28 mounted within the housing 14. The circuit board and integrated memory storage component and the plated contact surfaces are then insert molded into an injection molded plastic housing 14 to securely retain and protect the entire assembly. In the center of the plastic housing 14 is an aperture within which is located the snap cap 27 and snap washer 29 for the exemplary fastener mechanism allowing the electronic memory key 10 to be mechanically attached to a mating receptacle on an electronic or other type of unit.

Figure 6A:
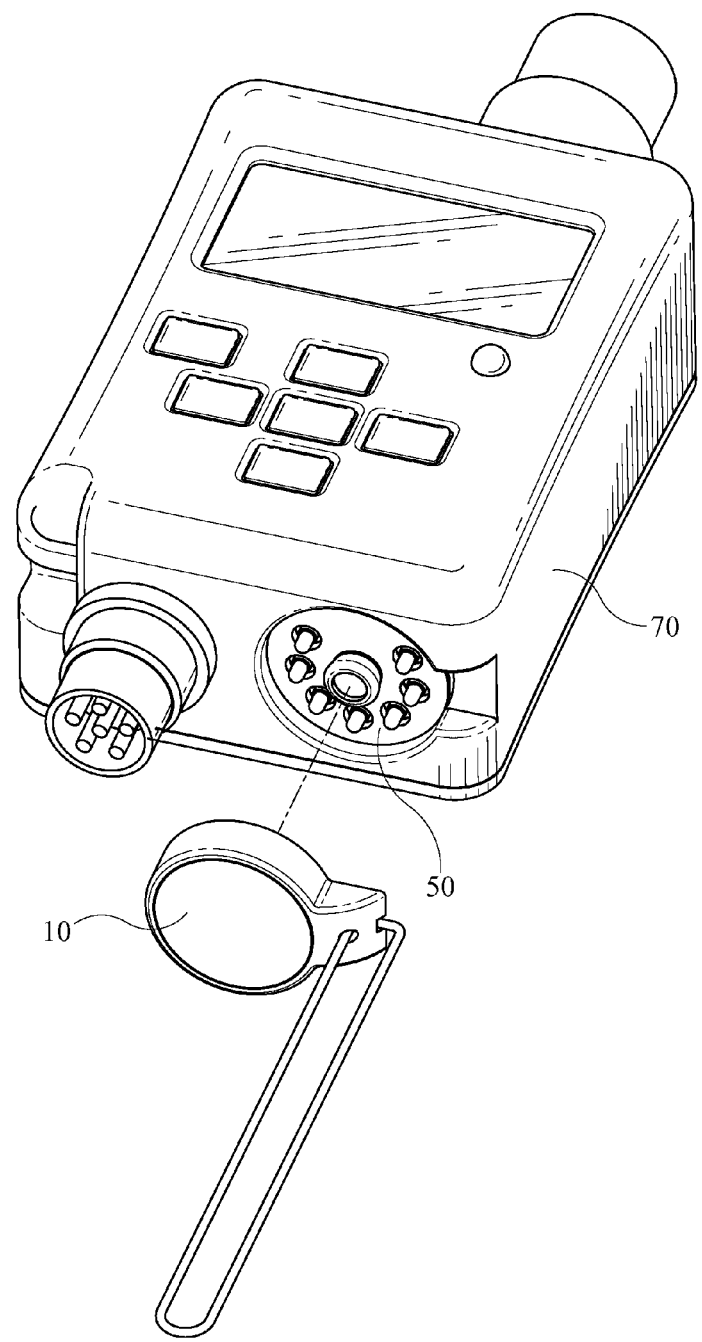
FIG. 6B is a view of the electronic memory key of the present invention for use with an electronic device and the corresponding receptacle receiving the electronic memory key shown in the various figures.
Figure 6B:
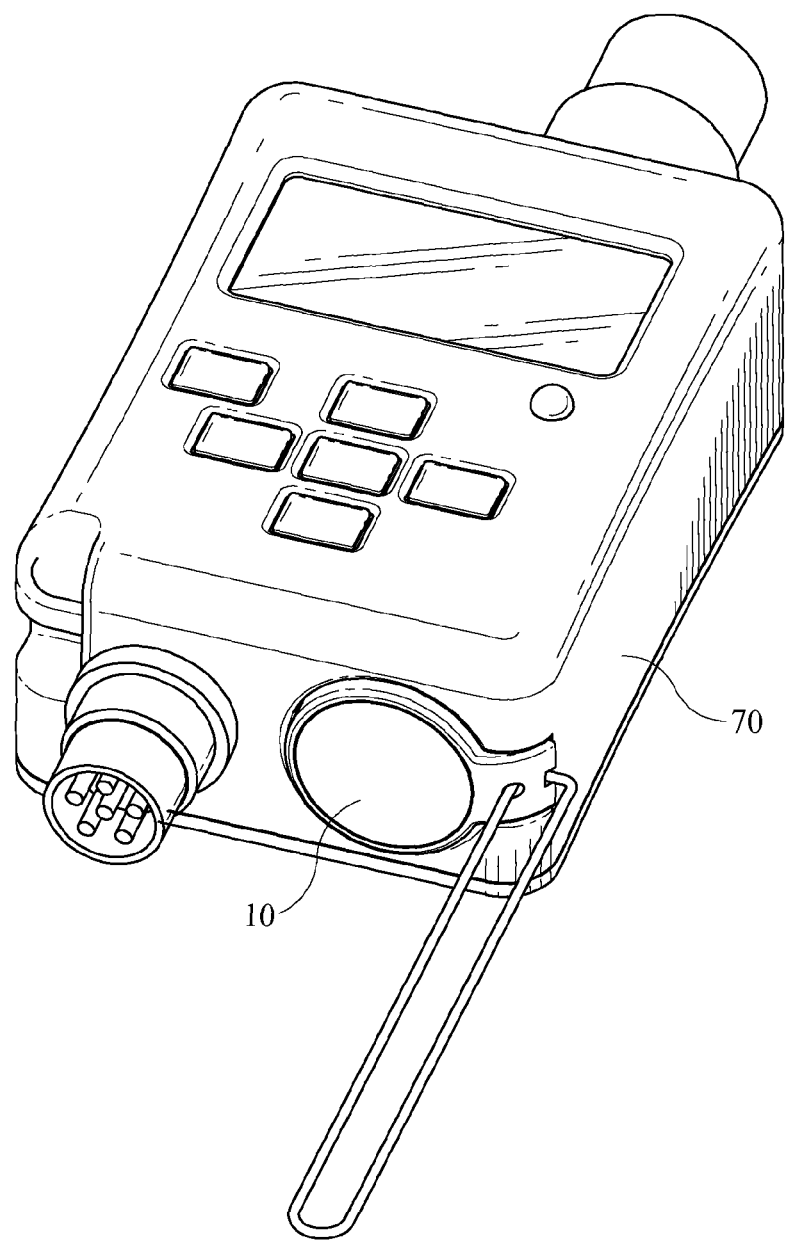

Turning specifically to the figures in the various embodiments disclosed herein, the electronic memory key 10 is shown in FIG. 1 with the annular housing 14 mated with the receptacle 50. In FIG. 1, only a portion of the receptacle 50 is shown for clarity purposes but, as depicted in FIGS. 6A and 6B, an electronic unit or other type of device 70 is depicted having an annular or similar mating receptacle 50 which receives the electronic memory key 10 therein. As shown in 6A, the mating receptacle is keyed such that the electronic memory key 10 may be inserted in only a single direction in order to ensure proper orientation and direct contact between the plated contact surfaces 20a retained within the housing 14 and the outwardly extending contacts 52 from the device 70. As shown in FIG. 6B, the electronic memory key 10 has been mated to the receptacle 50 for secure connection thereof and the mechanical fastening means, in this embodiment a snap button type action device, retains the electronic memory key 10 in position mated with the receptacle 50 as may be well understood in the art, by placement of the electronic memory key 10 within the receptacle. Such installation of the key 10 ensures direct electrical connectivity between the electronic memory storage and circuitry within the key 10 and the electronic unit 70 resulting in encryption, activation or other functionality of the device.

Returning to FIG. 1, as is generally shown in the various embodiments hereof, the electronic memory key 10 is depicted as circular or annular in structure, the housing 14 forming a cylindrical portion with partially accessible plated contact surfaces 20*a* as is shown allowing for direct electrical connectivity between the surfaces 20*a* and the electrical communication spring contacts 52 of the device 70. The surfaces 20*a* are circular and arranged in the same orientation as the spring contacts 52 depicted. Of course, many different embodiments may be utilized as variations on the design disclosed herein are to be incorporated within the teachings of the present disclosure. Primarily for understanding and description of the present embodiment memory key 10, it is depicted as being annular in nature. However, as may be understood, it may be desirable in various embodiments to provide flat contact surfaces 20*a* which are the mating surfaces for the outwardly extending contacts from the device base 50 through which electronic communication may occur. Further, as can be seen in this embodiment the contacts 52 extending outward from the electronic device to be controlled contact the key 10 in fixed annular and planar positions defined by apertures 18 formed on the bottom wall of the key thereby controlling the exact contact position and securement between key 10 and device 70. As may be readily understood such flat contact surfaces between the key and device simplify insertion and use of the CIK 10 by minimizing the adverse impact dirt or other foreign matter may have on the interface between key 10 and device 70.

As is known, many of the articles utilized in the prior art require longitudinally extending male and female engagement members for CIK interface. As such, for use in dirty or in rugged field conditions, it is very typical that dirt and other debris could clog the longitudinally extending key receptacle as well as the small contact surfaces on a longitudinally extending key face. Such dirt or other material could have direct negative impact on the connectivity between the memory key and the device contacts, particularly where a deep longitudinally extending receptacle is required for receipt of a standard longitudinally extending key.

Figure 4:
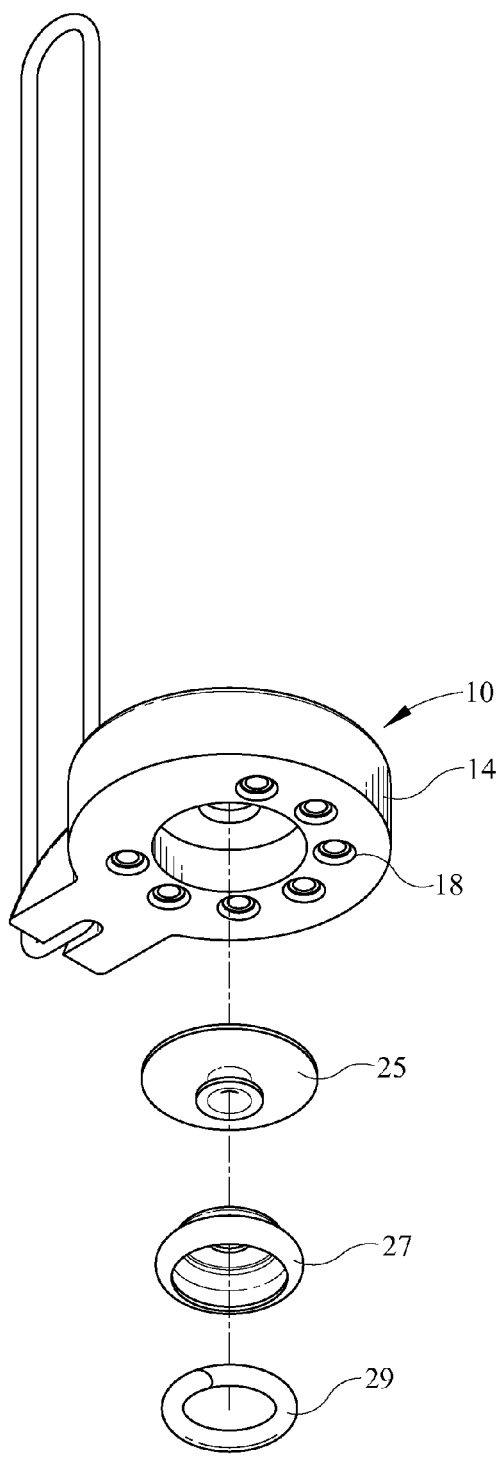
FIG. 4 is an exploded view of the electronic memory key of the present invention.
Figure 5:
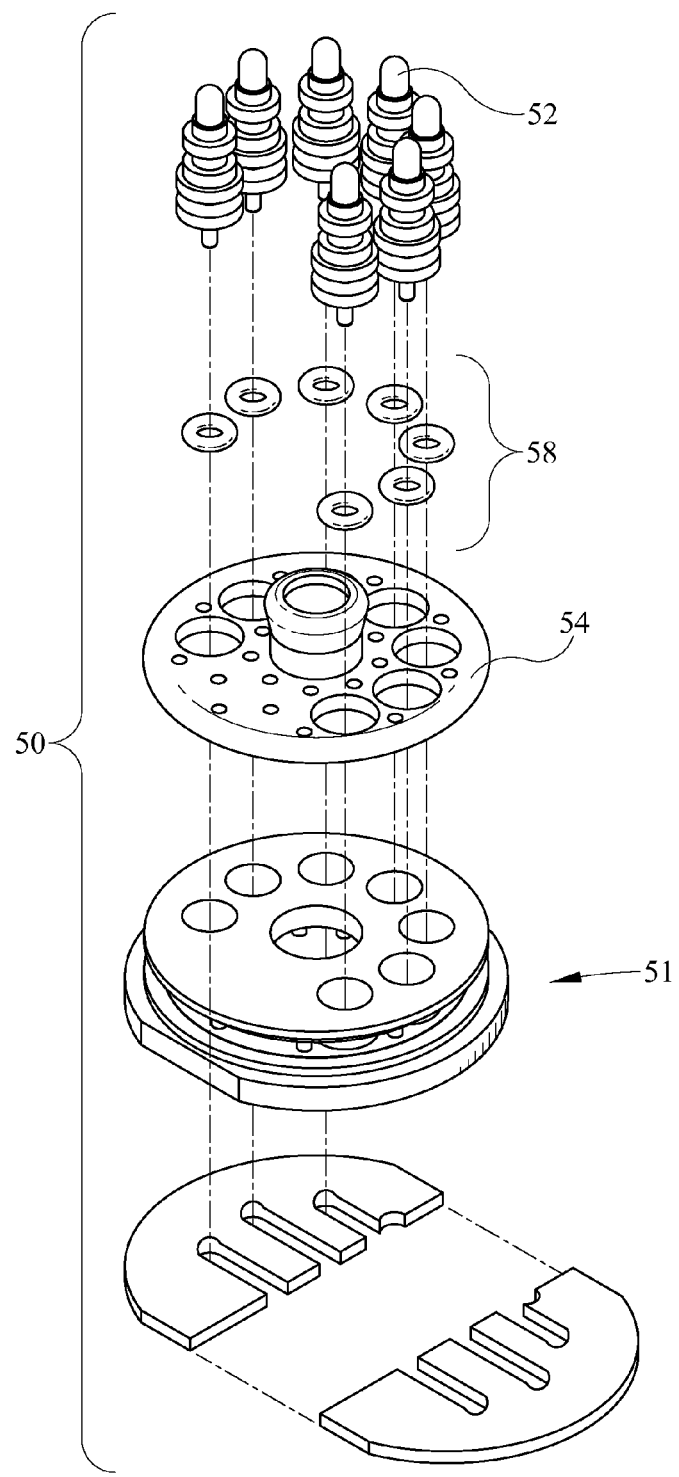
FIG. 5 is an exploded view of the interface portion of the device receptacle for use with the electronic memory key of the present invention; and FIG. 6A

For example, as shown in U.S. Pat. No. 4,752,679 incorporated herein by reference, a receptacle device and data key are shown wherein the key has an embedded electronic circuit component. The design is such that the circuit elements are embedded in the key and packaged in a sturdy configuration for insertion into a longitudinally extending receptacle as is shown. The receptacle is connected to an access device or similar electronic purpose. As mentioned, the teachings thereof are specifically designed for insertion into an electrical receptacle which, as is clearly shown, is longitudinally extending and may become filled with debris and the like thereby preventing proper electrical contact. As can be readily understood with the electronic key 10 depicted in FIG. 1 and FIG. 2, the plated contact surfaces 20*a* are minimally exposed on the underside of the housing 14 in a planar annular fashion, as is shown in FIG. 4, wherein a plurality of apertures 18 formed in the bottom surface of the housing 14 matingly receive the upwardly extending contacts 52 allowing electrical connectivity between the electronic circuit board and EEPROM or other memory device 28 molded within the housing 14 in the electronic device. In addition, the mechanical retention and attachment device 25, 27, 29 allows for the direct mechanical attachment of the housing 14 for the electronic memory key 10 to the electronic device through the use of the snap stand 54, the snap stand or snap post 54 extending upwardly from the annular base 51, as is shown in FIG. 5, thereby allowing direct mechanical connection and retention of the key 10 to the device 70. As is understood and may be desirable in the various embodiments depicted herein for purposes of implementing the depicted embodiment of the electronic memory key 10 shown in FIG. 1, flat surfaces are provided which are exposed on the bottom surface of the housing 14 through the utilization of a plurality of apertures 18 which provide access to the contact surfaces 20*a*, the apertures 18 engagingly receiving a plurality of spring contacts or extensions 52 from the electronic device. However, numerous implementations may be utilized for such a device and contact type connectivity between the electronic memory key 10 and the device 70 which would prevent the necessary requirement of having a longitudinally extending opening or slot with a plurality of small contact surfaces on a longitudinally extending key type device which necessarily would become clogged or debris filled during heavy use such as in combat or other field utilizations.

As may be readily understood, in the various embodiments depicted, the design may incorporate the utilization of a plurality of outwardly extending contacts or pogo style pegs 52 extending upward from the device necessarily contacting the contact surfaces 20*a* of the key 10. The design may require one or all of the contacts 52 be directly engaged on surfaces 20*a* thereby allowing electronic circuitry and EEPROM or memory 28 to communicate directly to the device 70 in an electronic communication protocol as required. Alternatively, the construction and order of the contacts and fastener may be reversed between the key 10 and the device 70 such that some or all of the associated structure are swapped between the articles.

Figure 2:
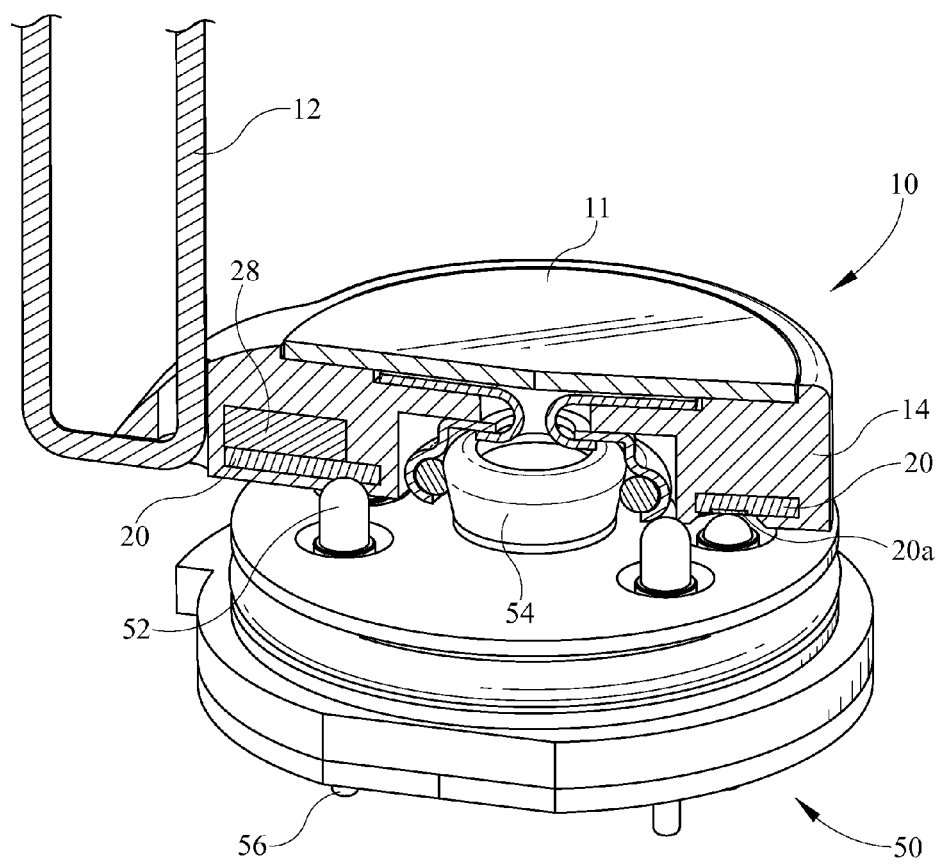
FIG. 2 is a side-sectional view of the electronic memory key and receptacle of FIG. 1 with portions of the receptacle shown.

In the present embodiment depicted, as shown in FIG. 2, the snap in place key 10 implements an epoxied top or cover 11 which allows for the snap stud 54 to be engaged by the snap washer 29 and the snap cap 27 all retained by the cap retainer 25 being held and retained within the aperture of the housing 14 shown in FIG. 4. As shown, the mechanical attachment of the key 10 on the device and the snap stud 54 secures the key in place and allows direct contact of the spring contacts 52 on the electronic contact or other surfaces 20*a*. As can be seen in FIG. 2, the spring contacts 52 may be pogo style vertically adjustable in that they may move in the vertical direction while receiving downward pressure from the contact surfaces 20*a* after snapping of the snap device on the snap stud securing the key onto the receptacle 50. The spring contacts 52 may telescope downward into the annular base 51 through the apertures formed in the snap post and base, the spring contacts 52 environmentally sealed by the O-rings 58 shown in FIG. 5, each of the pegs having a spring like bias forcing each outwardly, but each peg may also be downwardly compressible while maintaining electrical connectivity in contact with the plated contact surfaces 20*a*. Such downward compressibility may be implemented in many known methods. This receptacle 50 and the pogo style spring contacts 52 provide for a mechanical snap connection between the key 10 and the mating receptacle located on the device 70 without the necessity of having a slide-in style or twist to lock in place key design although such may be incorporated within the teachings hereof. The design additionally allows for the pogo style spring contacts 52 to properly position themselves within the apertures 18 on the CIK 10 while also being depressable or collapsible within the device receptacle 50 or upon themselves. Such design allows easy and proper location of the pegs 52 on the key 10 while the upward bias assures continued contact between the pegs and the contact surfaces 20*a*. Of course, many designs may be implemented utilizing the teachings hereof assuring the ease of installation of the key within the receptacle while also maintaining continued electrical communicative contact between key 10 and device 70.

Figure 3:
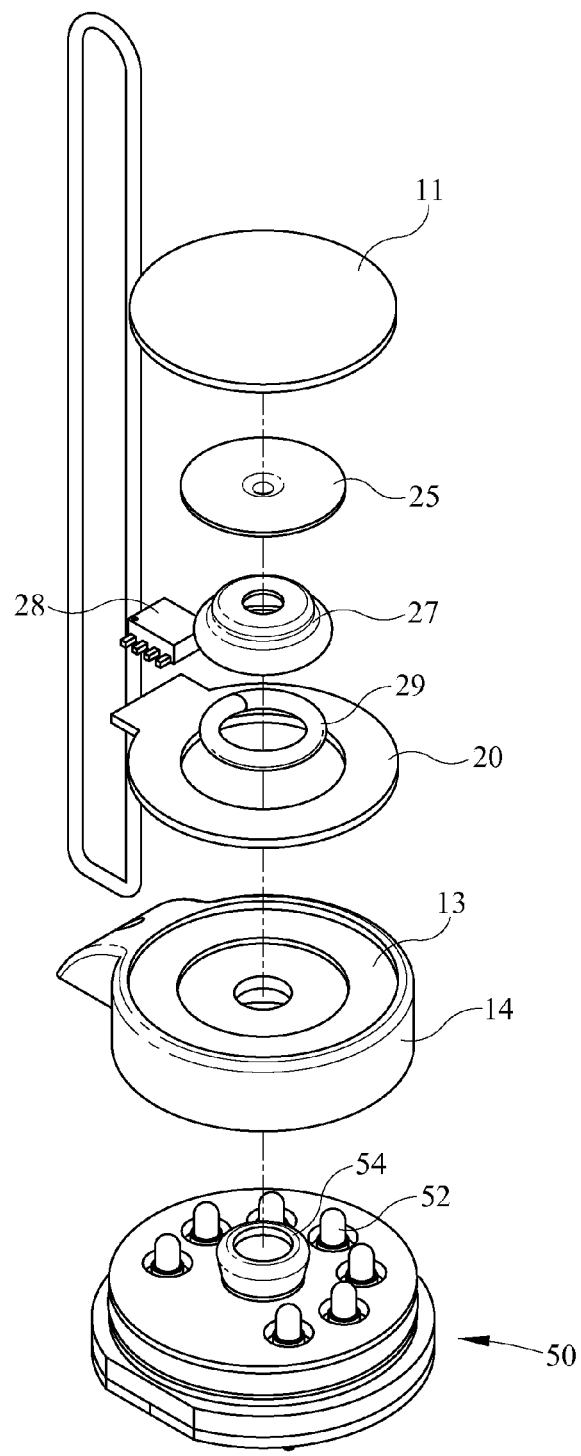
FIG. 3 is an exploded view of the electronic memory key of the present invention in combination with the device receptacle and base portion exposed.

As is depicted, a housing 14 having substantially flat contact surfaces has a plurality of electrical contacts formed by the contact surfaces 20*a* and corresponding apertures 18 formed in the housing, the electrical contacts being in electrical communication with the electronic memory 28 and circuitry 20 located within the housing. The housing 14 is designed to engage with the device base 50 which has a substantially flat and generally annular contact surface with a plurality of electrical contacts or pegs 52 corresponding in position to the electrical contacts and apertures 18 of the contact surfaces of the housing 14. Each of the electrical contacts or pegs which may be adjustable and which are formed on the contact surface of the device may therein be in electrical communication with the annular contact surfaces 20*a* and the electronic circuitry 20 and memory 28 of the electronic key. This can be seen from the construction in FIG. 3 where the plated contact surfaces 20*a* are integral to the circuit board 20 which is insert molded into the housing 14. Such a design of the mold leaves the recesses 18 in the housing for acceptance of the spring contacts. However, many different constructions and variations may be utilized and implemented within the teachings hereof including reversal and interchanging of the various structures between the receptacle and the key. Further, while a snap cap and washer is shown as a mechanical attachment in a fixation methodology between the housing and key 10 and the device 70, many devices which allow mechanical connectivity and attachment between the electronic memory key 10 and the device 70 may be implemented and utilized, the only requirement being that the crypto ignition key 10 is securely retained in position and contacting the electrical contacts on the device contact surface such that electrical communication may take place between the key and the device.

The foregoing description of structures and methods has been presented for purposes of illustration. It is not intended to be exhaustive or to limit the invention to the precise structure and functionality disclosed, and obviously many modifications and variations are possible in light of the above teaching. It is understood that while certain forms of CIK designs and mating receptacles have been illustrated and described, it is not limited thereto except insofar as such limitations are included in the following claims and allowable functional equivalents thereof.

We claim:

1. A crypto ignition key, comprising:
    a housing having substantially flat contact surface, said contact surface having a plurality of electrical contacts, said electrical contacts being in electrical communication with an electronic memory located within said housing;
    said housing designed to engage a base having a substantially flat and generally annular contact surface with a plurality of electrical contacts corresponding in position to said electrical contacts of said contact surface of said housing, said plurality of electrical contacts of said base being biased to engage said electrical contacts of said contact surface of said housing;
    wherein each said electrical contacts on said contact surface of said housing is in electrical communication with each said electrical contact of said base when said housing is engaged with said base.

2. The crypto ignition key of claim 1 wherein each said electrical contact on said contact surface of said base is resiliently depressible.

3. The crypto ignition key of claim 2 wherein each said electrical contact on said contact surface of said housing is recessed in an aperture and wherein each said electrical contact on said contact surface of said base is at least partially depressed and applies pressure against each said electrical contact on said contact surface of said housing when said housing is engaged with said base.

4. The crypto ignition key of claim 1 wherein each said electrical contact on said contact surface of said housing is recessed in an aperture.

5. The crypto ignition key of claim 1 wherein said housing has a mounting recess, said mounting recess having an opening formed generally in the same plane as said contact surface of said housing.

6. The crypto ignition key of claim 5 wherein each said electrical contact of said housing is formed on a radial circuit board surrounding said mounting recess and located within said housing.

7. The crypto ignition key of claim 5 wherein a mechanical snap fastener is secured to said housing and located within said mounting recess.

8. The crypto ignition key of claim 7 wherein a protrusion extends from said housing, said protrusion being receivable in said mounting recess, and wherein said mechanical snap fastener is designed to operably and removably engage said protrusion.

9. The crypto ignition key of claim 8 wherein said mounting recess is generally annular, said protrusion extends perpendicularly from the same plane as said contact surface of said base, and said mechanical snap fastener is designed to operably and removably engage said protrusion by frictionally forcing an inward facing portion of said snap member over a lip on the periphery of said protrusion.

10. The crypto ignition key of claim 7 wherein said mechanical snap fastener is connected to a neck portion and a flat base, said flat base being received in a void of said housing and securing said mechanical snap fastener to said housing.

11. The crypto ignition key of claim 1 wherein said base has a mounting recess having an opening formed in the same plane as said contact surface of said base, a protrusion extends from the same plane as said contact surface of said contact surface of said housing, and a mechanical snap fastener is located within said mounting recess, wherein said mechanical snap fastener is designed to operably and removably engage said protrusion.

12. The crypto ignition key of claim 1 wherein said housing is formed from a moldable polymer and said electronic memory is molded into said housing.

13. A crypto ignition key system, comprising:
    a housing with an internally located electronic memory and substantially flat contact surface, said contact surface having a plurality of electrical contacts in electrical communication with said electronic memory;
    a device base for receiving said housing with a substantially flat and generally annular contact surface having a plurality of outwardly extending electrical contacts;
    wherein a mounting recess is provided in said housing, said mounting recess having a mechanical snap fastener;
    wherein said housing and said base are engageable at said mechanical snap fastener such that at least a portion of a bottom surface of said housing is in contact with said contact surface of said base, and wherein at least one of said electrical contacts on said contact surface of said housing is in electrical communication with at least one of said electrical contacts on said base when said housing is engaged with said base.

14. The crypto ignition key system of claim 13 wherein a mounting recess is provided in said housing, said mounting recess housing a mechanical snap fastener and having openings formed in the same plane as said contact surfaces of said housing.

15. The crypto ignition key system of claim 14 wherein each said electrical contact of said housing is formed on a radial circuit board surrounding said mounting recess and located within said housing.

16. The crypto ignition key system of claim 14 wherein said mounting recess is constructed to receive an annular protrusion extending from said base and wherein said mechanical snap fastener is designed to operably and removably engage said annular protrusion.

17. The crypto ignition key system of claim 16 wherein said mechanical snap fastener is of the male variety and engages a recess of the female variety in said annular protrusion.

18. The crypto ignition key of claim 16 wherein said mechanical snap fastener is of the female variety and frictionally receives said annular protrusion.

19. The crypto ignition key of claim 14 wherein said mounting recess is centrally located in said substantially flat surface of said housing.

20. The crypto ignition key of claim 19 wherein said electrical contacts are annularly placed along said contact surfaces of said housing and said base.

21. The crypto ignition key of claim 13 wherein said electrical contacts of said contact surface of said base extend perpendicularly from said contact surface and wherein said electrical contacts of said contact surface of said housing are receptacles in said contact surface.

22. The crypto ignition key of claim 21 wherein said electrical contacts of said base are resiliently depressible and engage said receptacles when said housing and said base are engaged.

23. A crypto ignition key system, comprising:
a housing with an internally located electronic memory and substantially flat contact surfaces, said contact surfaces having a plurality of electrical contacts in electrical communication with said electronic memory;
a device base with a substantially flat and generally annular contact surface having a plurality of outwardly extending electrical contacts, said plurality of outwardly extending electrical contacts being biased and linearly movable between a first position and a second position;
wherein said housing and said base are mateable such that a bottom surface of said housing is in contact with said contact surface of said base;
wherein each of said electrical contacts on said contact surface of said housing is in electrical communication with each of said electrical contacts on said base when said housing is engaged with said base, so that said electrical contacts of said base move from one of said first position and said second position to the other of said first position and said second position; and
wherein said housing and said base are mateable through engagement of a mechanical snap fastener housed in a mounting recess and a protrusion.

24. The crypto ignition key system of claim 23, wherein said mounting recess is provided in said housing, said mounting recess having an opening formed in the same plane as said contact surface of said housing, and wherein said protrusion extends from said base from the same plane as said contact surface of said base.

25. The crypto ignition key system of claim 24 wherein said mechanical snap fastener is of the female variety and frictionally receives said annular protrusion.

26. The crypto ignition key of claim 25 wherein said electrical contacts of said contact surface of said base are resiliently depressible and extend perpendicularly from said contact surface and wherein said electrical contacts of said contact surface of said housing are receptacles in said contact surface.

27. The crypto ignition key of claim 26 wherein said mounting recess is centrally located in said substantially flat surface of said housing.

28. The crypto ignition key of claim 25 wherein said electrical contacts are annularly placed along said contact surfaces of said housing and said base.

29. The crypto ignition key of claim 28 wherein said electrical contacts are equally spaced along said contact surfaces of said housing and said base.

30. The crypto ignition key of claim 24 wherein said electrical contacts of said contact surface of said base extend perpendicularly from said contact surface and wherein said electrical contacts of said contact surface of said housing are receptacles in said contact surface.

31. The crypto ignition key of claim 30 wherein said electrical contacts of said base are resiliently depressible and engage said receptacles when said housing and said base are engaged.

32. An electronic memory key for use in combination with an electronic device, comprising:
an electronic key having housing and a bottom wall with exposed contacts, said exposed contacts in electrical communication with a memory storage device and storing unique coded encryption data;
said housing having a mechanical connector, said mechanical connector mechanically interfacing with a structure on an electronic device, said mechanical connector of said bottom wall of said housing and said electronic device allowing said electronic key to be firmly removably retained on said device;
outwardly extending contacts on said electronic device aligned to engage with said exposed contacts on said electronic key;
said housing having a keyed orientation structure to align said key housing with respect to said device to allow electrical contact between said exposed contacts on said key with said outwardly extending contacts on said device.

* * * * *